(12) United States Patent
Alves et al.

(10) Patent No.: US 11,267,360 B2
(45) Date of Patent: Mar. 8, 2022

(54) MODULAR CHARGING SYSTEMS FOR VEHICLES

(71) Applicant: Apple Inc., Cupertino, CA (US)

(72) Inventors: Jeffrey M. Alves, Pleasanton, CA (US); Peteris K. Augenbergs, Woodside, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 16/916,990

(22) Filed: Jun. 30, 2020

(65) Prior Publication Data

US 2021/0402888 A1 Dec. 30, 2021

(51) Int. Cl.
| | |
|---|---|
| *H02J 7/00* | (2006.01) |
| *H02J 7/14* | (2006.01) |
| *B60L 53/62* | (2019.01) |
| *H02J 7/35* | (2006.01) |
| *B60L 53/22* | (2019.01) |
| *B60L 50/64* | (2019.01) |
| *B60L 53/51* | (2019.01) |
| *B60L 53/30* | (2019.01) |
| *B60L 53/16* | (2019.01) |

(52) U.S. Cl.
CPC ............. *B60L 53/62* (2019.02); *B60L 50/64* (2019.02); *B60L 53/16* (2019.02); *B60L 53/22* (2019.02); *B60L 53/305* (2019.02); *B60L 53/51* (2019.02); *H02J 7/0045* (2013.01); *H02J 7/35* (2013.01); *B60L 2210/30* (2013.01); *H02J 2207/20* (2020.01)

(58) Field of Classification Search
USPC ........................................ 320/109, 134, 145
See application file for complete search history.

(56) References Cited

U.S. PATENT DOCUMENTS

| | | | |
|---|---|---|---|
| 7,663,345 B2* | 2/2010 | Ozawa ................. | H02J 7/0068 320/140 |
| 8,410,750 B2* | 4/2013 | Lee .......................... | H02J 1/14 320/101 |
| 8,772,963 B2* | 7/2014 | Henkel .................... | H02J 9/06 307/64 |

(Continued)

OTHER PUBLICATIONS

Wikipedia, "Combined Charging System", Date Unknown, downloaded May 11, 2020, https://en.wikipedia.org/wiki/Combined_Charging_System (7 pp).

(Continued)

*Primary Examiner* — Alexis B Pacheco
(74) *Attorney, Agent, or Firm* — Young Basile Hanlon & MacFarlane, P.C.

(57) ABSTRACT

Systems and methods for modular charging of vehicles are described. For example, a method may include connecting a vehicle to a charger using a charging plug interface that includes a first pair of conductors connected to alternating current terminals of an on-board alternating current-to-direct current converter of the vehicle and a second pair of conductors connected to terminals of a battery of the vehicle; and charging the battery of the vehicle via direct current flowing through the second pair of conductors concurrent with charging of the battery via alternating current flowing through the first pair of conductors to power the on-board alternating current to direct current converter.

24 Claims, 9 Drawing Sheets

(56) References Cited

U.S. PATENT DOCUMENTS

| | | | | |
|---|---|---|---|---|
| 10,389,126 B2 * | 8/2019 | Kearns | ............... | H02J 3/24 |
| 10,756,543 B2 * | 8/2020 | Detmers | ............... | H02J 7/04 |
| 2003/0184937 A1 * | 10/2003 | Kanouda | ............... | H02J 9/061 |
| | | | | 361/90 |
| 2008/0315803 A1 * | 12/2008 | Yonemori | ............... | B60L 15/007 |
| | | | | 318/148 |
| 2010/0097031 A1 * | 4/2010 | King | ............... | H02J 7/0045 |
| | | | | 320/109 |
| 2012/0187919 A1 * | 7/2012 | Andersson | ............... | B60W 10/26 |
| | | | | 320/138 |
| 2012/0306468 A1 * | 12/2012 | Butzmann | ............... | H02J 7/1423 |
| | | | | 323/304 |
| 2016/0094074 A1 * | 3/2016 | Alves | ............... | H01F 38/14 |
| | | | | 320/108 |
| 2018/0301986 A1 * | 10/2018 | Alves | ............... | B60L 3/003 |

OTHER PUBLICATIONS

Wikipedia, "SAE J1772", Date Unknown, downloaded May 11, 2020, https://en.wikipedia.org/wiki/SAE_J1772#Signaling (12 pp).

\* cited by examiner

MODULAR CHARGING SYSTEMS FOR VEHICLES

TECHNICAL FIELD

This disclosure relates to modular charging systems for vehicles.

BACKGROUND

Electric vehicles (e.g., electric cars) are charged from prevalent legacy alternating current power outlets of the existing infrastructure. An on-board charger (OBC) is included in the vehicle to enable convenient charging of its battery. By having the OBC on the car, the charging infrastructure can be less expensive (e.g., not every charger needs power conversion electronics, and some may pass AC power directly from a power grid to the car). The power level that can be achieved using an on-board charger is practically limited by size and weight considerations for equipment installed in the vehicle, which causes long charge times. Fast DC charging is available at specialized charging stations available only at select locations.

SUMMARY

Disclosed herein are implementations of modular charging systems for vehicles.

In a first aspect, the subject matter described in this specification can be embodied in systems that include a first alternating current to direct current converter; a charging plug interface including a first pair of conductors connected to alternating current input terminals of the first alternating current to direct current converter and a second pair of conductors connected to direct current terminals of the first alternating current to direct current converter; and a processing apparatus configured to: receive one or more control signals while a vehicle is connected to the charging plug interface; and, responsive to the one or more control signals, charge a battery of the vehicle via direct current flowing through the second pair of conductors concurrent with charging of the battery via alternating current flowing through the first pair of conductors to power an on-board alternating current to direct current converter of the vehicle.

In a second aspect, the subject matter described in this specification can be embodied in methods that include connecting a vehicle to a charger using a charging plug interface that includes a first pair of conductors connected to alternating current terminals of an on-board alternating current-to-direct current converter of the vehicle and a second pair of conductors connected to terminals of a battery of the vehicle; and charging the battery of the vehicle via direct current flowing through the second pair of conductors concurrent with charging of the battery via alternating current flowing through the first pair of conductors to power the on-board alternating current to direct current converter.

In a third aspect, the subject matter described in this specification can be embodied in vehicles that include a battery configured to deliver power to one or more motors to move the vehicle; an on-board alternating current to direct current converter with direct current terminals connected to terminals of the battery; a charging plug interface including a first pair of conductors connected to alternating current terminals of the on-board alternating current to direct current converter and a second pair of conductors connected to terminals of the battery; and a processing apparatus configured to transmit one or more control signals to invoke charging of the battery via direct current flowing through the second pair of conductors concurrent with charging of the battery via alternating current flowing through the first pair of conductors to power the on-board alternating current to direct current converter.

BRIEF DESCRIPTION OF THE DRAWINGS

Described herein are systems and methods for modular charging of vehicles. Some implementations may be used to provide a premium home charging experience for an electric vehicle. Charge times may be reduced by implementing concurrent use of an on-board alternating current to direct current converter and an alternating current to direct current converter of an external charger, which may be installed in the home. In some implementations, a high-capacity battery in the external charger is used to enable even faster charging of the vehicle where the external battery has been previously charged using efficient means. For example, the external charger battery may be charged using a solar cell, or from the power grid using demand sensitive or time-of-use management protocols.

One of the issues with charging an electric vehicle is all of the different types of charging (e.g., alternating current and direct current power sources), locations (home, work, destination, or road trip stop), and power levels (e.g., 1.2 kW, 7 kW, 10 kW, 20 kW, 150 kW, or 350 kW). An on-board charger (OBC) (e.g., a 7 kW charger or a 20 kW charger) is installed in the vehicle and allows a user to plug in to standard infrastructure, and if that is enough for the user's needs at home, allows for a relatively inexpensive installation in at the home to accommodate. Users who want more power, and faster charging times, at home (e.g., 10-20 kW), and who have a power infrastructure including an alternating current circuit breaker panel that supports it, can also install an off-board charger at the home (e.g., mounted on a wall) which is configured to convert additional power (e.g., an additional 13 kW) for charging a battery of the vehicle. The off-board charger can allow the vehicle battery to be charged concurrently with both alternating current and direct current. For example, the off-board charger may be connected to one or more wall outlets that provide alternating current power (e.g., 240 Volts AC at 60 Hz). For example, a charging plug interface (e.g., including a cord) of the off-board charger may route alternating current to the on-board charger of the vehicle (e.g., providing 7 kW of charging power), while at the same time utilizing the output of the off-board charger's alternating current to direct current converter to provide power (e.g., an additional 13 kW) to the vehicle as direct current though the charging plug interface. Such a setup may provide the benefit of utilizing the OBC (e.g., a 7 kW charger) that a vehicle operator has already purchased, and reducing the size and cost of the external charger used to achieve a given charging rate. For example, one of the chargers (e.g., the off-board charger) may operate in current control mode and one of the chargers (e.g., the on-board charger) may operate in voltage control mode, which may allow the chargers to share their output current into the battery of the vehicle. In some implementations, a charging communications system of the vehicle controls both the alternating current based on-board charger and the direct current output of the off-board charger.

Figure 1:
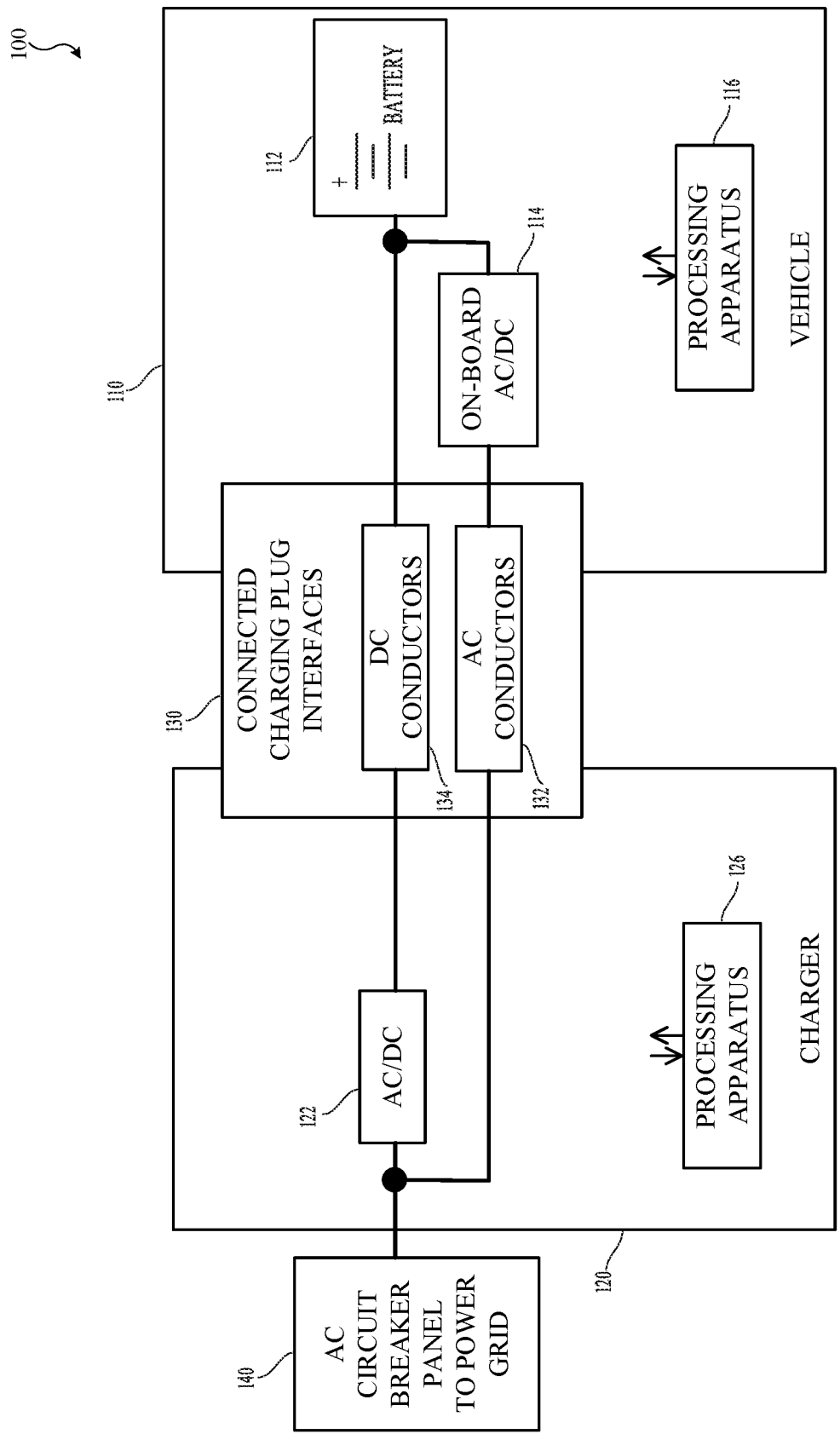

An on-board should be limited to conserve space and weight in the vehicle. The off-board charger supports a charging mode for the vehicle that allows it to concurrently utilize direct current and alternating current through a charging plug interface to charge its battery. Control signaling between the vehicle and the off-board charger (e.g., through conductors of the charging plug interface or via wireless communications) may be used to allow the off-board charger to indicate it's available charging capabilities to the vehicle and to allow the vehicle to select what charging mode(s) will be applied to charge the vehicle battery. For example, J1772 protocol negotiation between the charger and a battery management system of the vehicle may be utilized. This technique may be used to determine what devices are connected and then what charging mode should be used.

In some implementations, a solar cell in a home installation is used to provide power to charge the vehicle battery. For example, the solar cell may provide power to the vehicle battery via a direct current to direct current converter that outputs through the charging plug interface. For example, the solar cell may be used to charge an external battery connected to the off-board charger, and the external battery can later be used to quickly charge the vehicle battery via direct current through the charging plug interface. For example, adding a bidirectional direct current to direct current converter in the implementation may support very fast home charging (e.g., 25-100+ kW) from the external battery (e.g., a home energy storage) to the vehicle. Making the direct current to direct current converter bidirectional may allow the vehicle and the home energy storage to be used in tandem in the event of a power outage. Transfer of energy from a home energy storage to a vehicle may allow flexible charging times and/or fast charging at home. Transfer of energy from a vehicle to a home energy storage may provide increased capacity of the energy buffer for blackouts and time-of-use optimization.

Where a solar system already has a direct current to direct current converter coupled to the photovoltaic installation, as well as a direct current to alternating current converter (e.g., an inverter), one or more of these converters or sub-stages of converters may be re-used for: fast charge from the external battery (e.g., turn off solar while fast charging the vehicle for 20-30 minutes); and vehicle to home storage transfer to utilize the converter at night when the solar system is not producing energy.

Some implementations of the systems and methods describe herein may provide advantages, such as, providing higher power charging (e.g., 7+13=20 kW) for faster charge times and providing a single connector for both alternating current and direct current charging.

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a block diagram of an example of a system for modular charging of a vehicle battery.

Figure 2A:
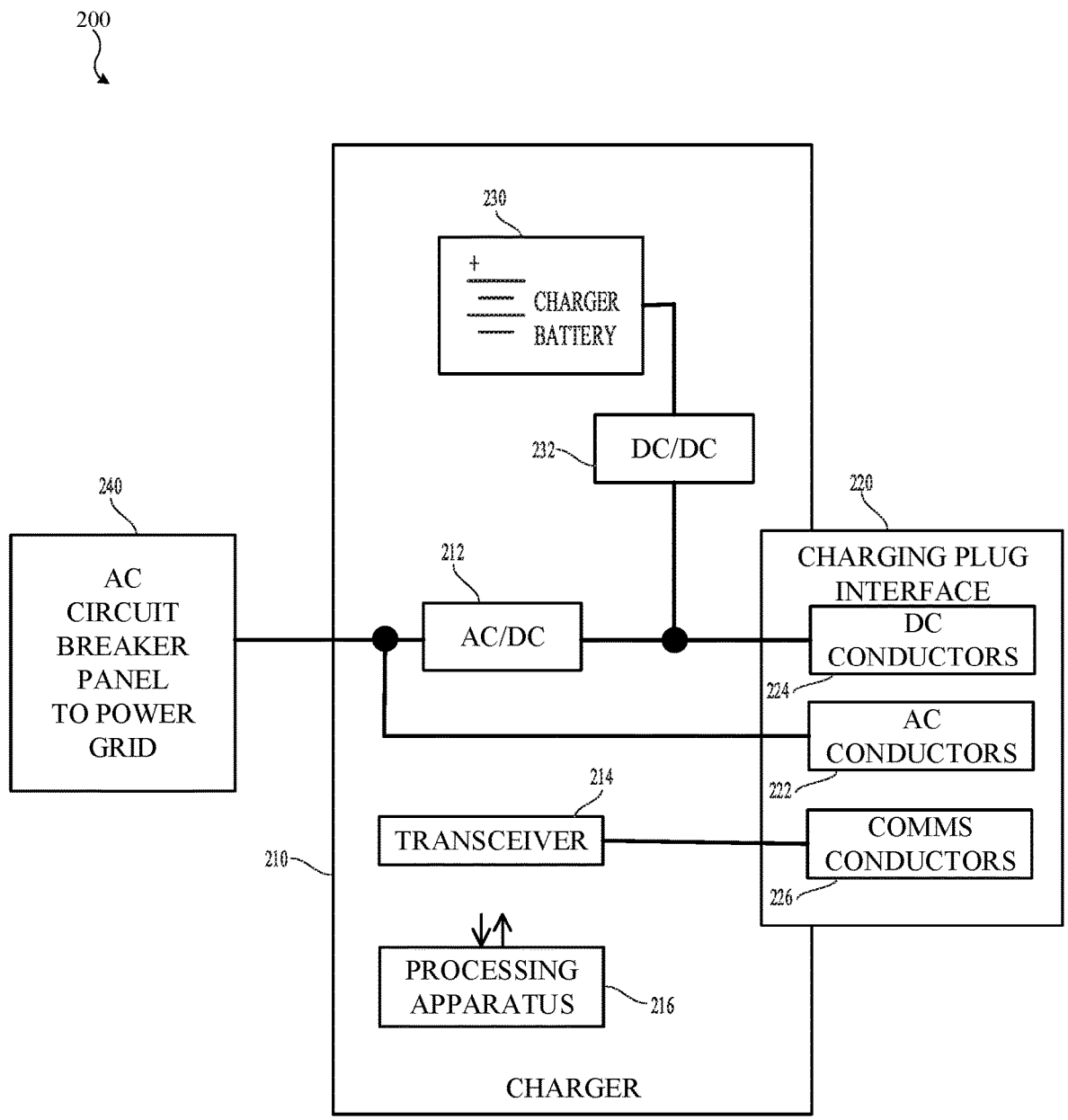

FIG. 2A is a block diagram of an example of a system including charger with a charging plug interface for connecting to a vehicle and charging a vehicle battery.

Figure 2B:
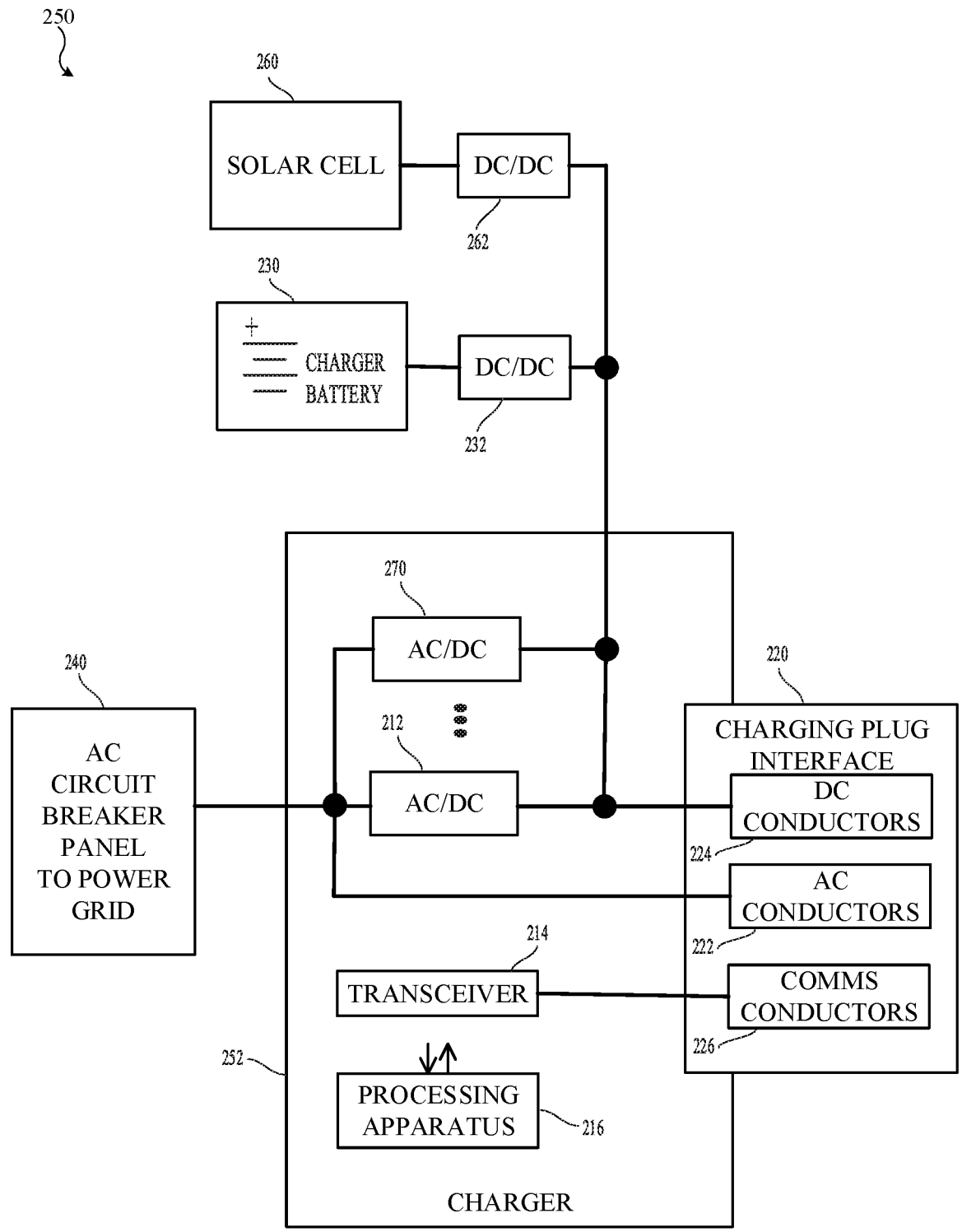

FIG. 2B is a block diagram of an example of a system including a solar cell and a charger with a charging plug interface for connecting to a vehicle and charging a vehicle battery.

Figure 2C:
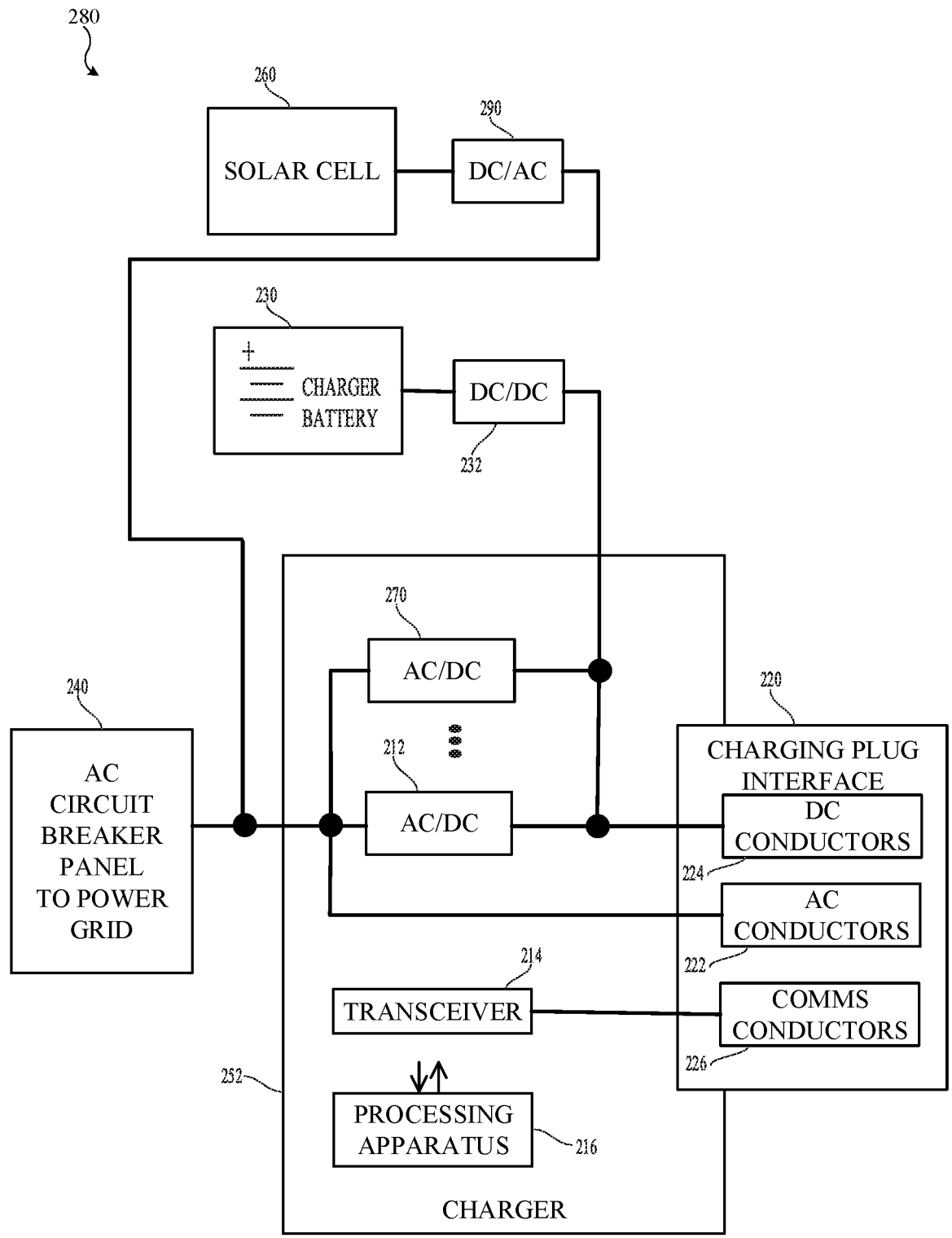

FIG. 2C is a block diagram of an example of a system including a solar cell connected via an alternating current bus to a charger with a charging plug interface for connecting to a vehicle and charging a vehicle battery.

Figure 3:
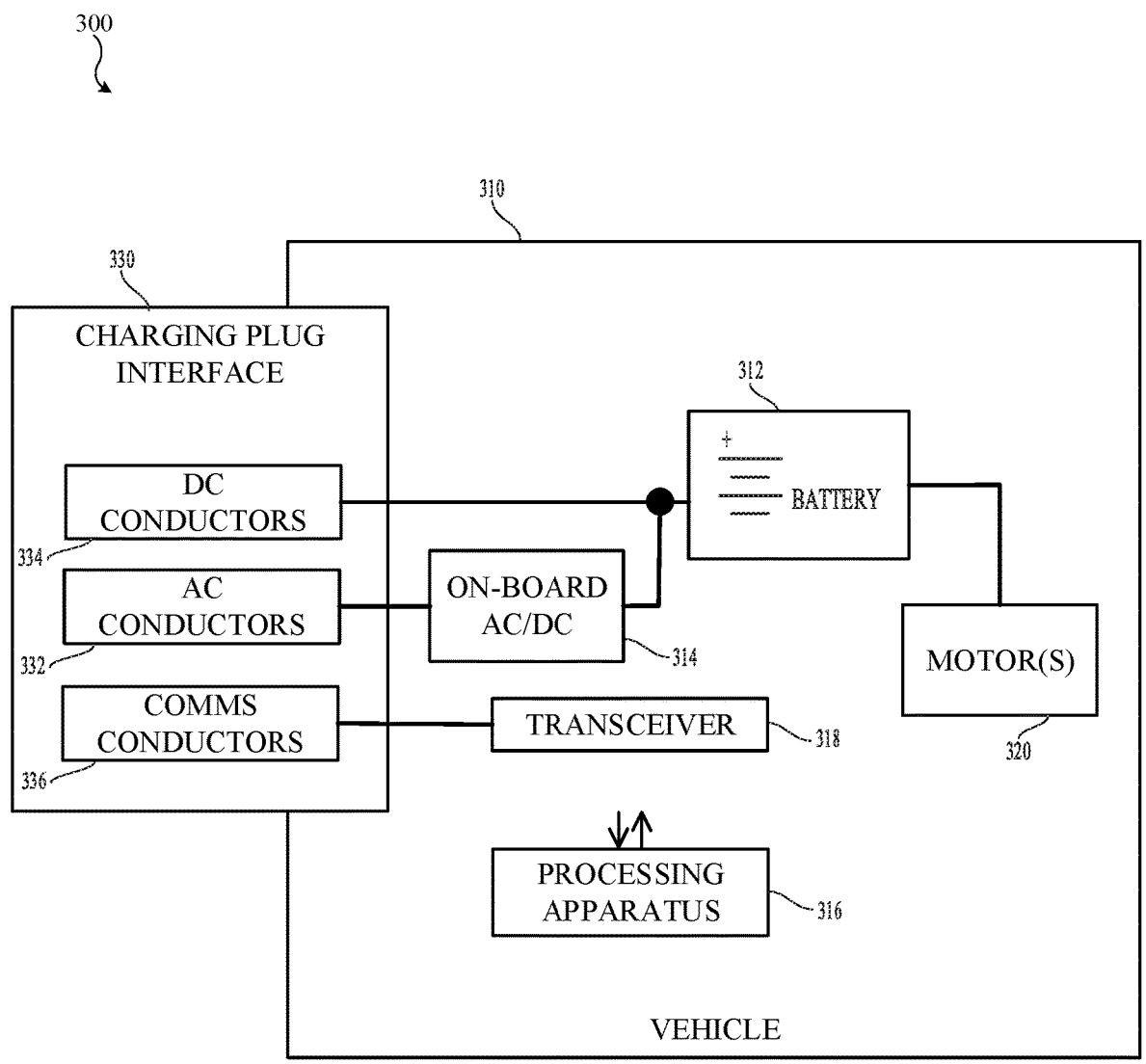

FIG. 3 is a block diagram of an example of a system including a vehicle with a charging plug interface configured to facilitate charging of a vehicle battery.

Figure 4:
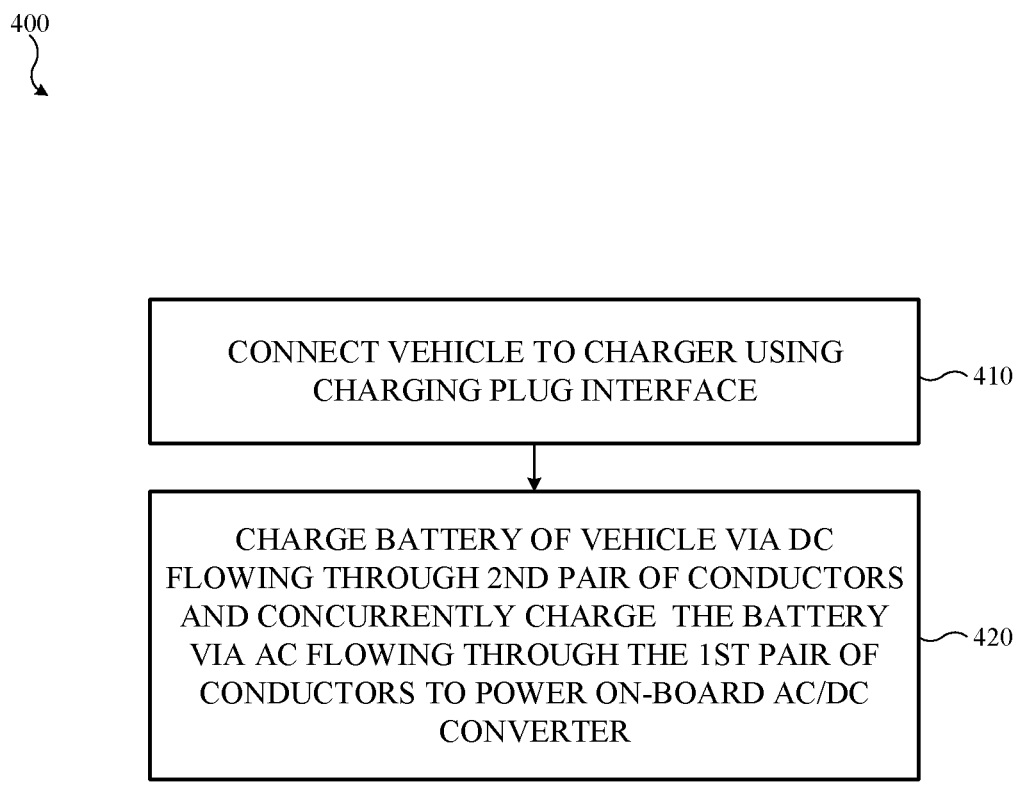

FIG. 4 is a flow chart of an example of a process for charging a vehicle battery using an external charger.

Figure 5:
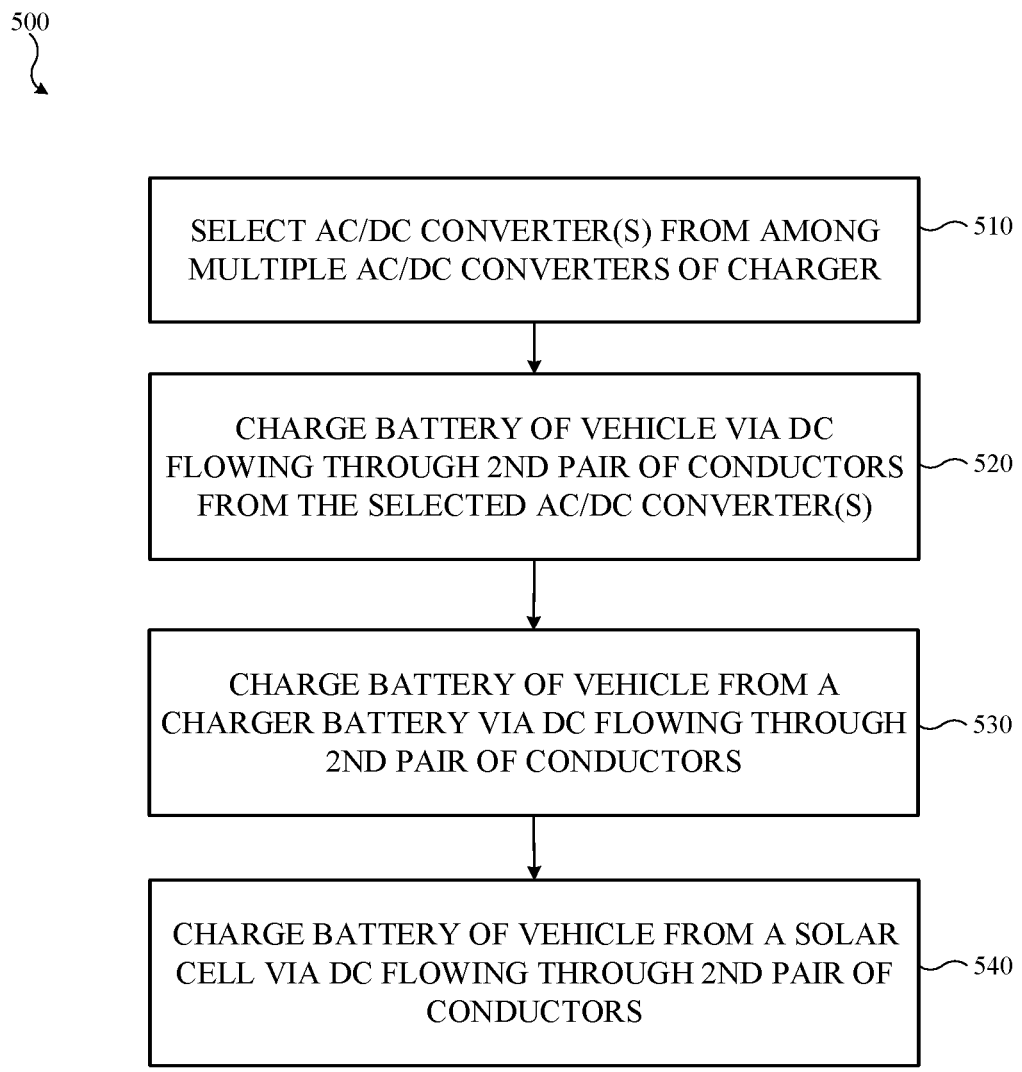

FIG. 5 is a flow chart of an example of a process for charging a vehicle battery using a variety of power sources coordinated by an external charger.

Figure 6:
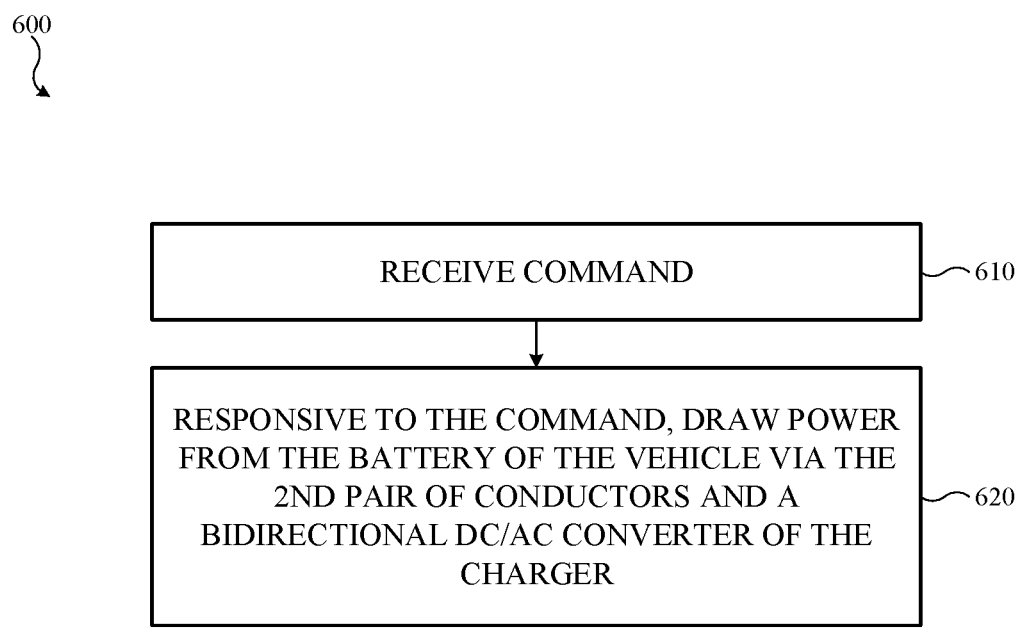

FIG. 6 is a flow chart of an example of a process for powering an external system from a vehicle battery via an external charger.

Figure 7:
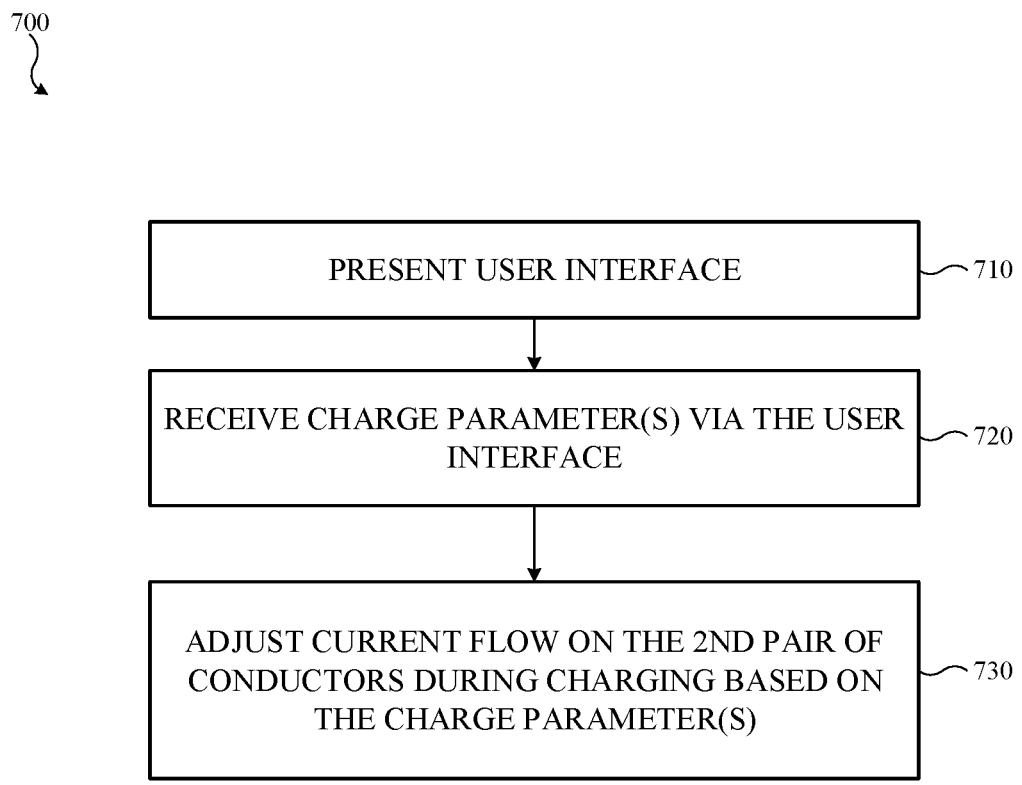

FIG. 7 is a flow chart of an example of a process for providing a user interface to enable user control of a charging process for a vehicle battery.

DETAILED DESCRIPTION

Described herein are systems and methods that may be used for modular charging of vehicle batteries.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

FIG. 1 is a block diagram of an example of a system 100 for modular charging of a vehicle battery. The system 100 includes a vehicle 110 connected to a charger 120 via mated charging plug interfaces 130. The charger 120 is connected to an alternating current circuit breaker panel 140 that connects to a power grid. The vehicle 110 includes battery 112, an on-board alternating current to direct current converter 114, and a processing apparatus 116. The charger 120 is external to the vehicle 110 and thus does not add weight and take up space in the vehicle 110 when the vehicle is disconnected from the charger 120 and moving. The charger 120 includes an alternating current to direct current converter 122 and a processing apparatus 126 that is configured to control the alternating current to direct current converter 122 and communicate with the processing apparatus 116 of the vehicle 110. For example, the system 100 may be used to implement the process 400 of FIG. 4, the process 500 of FIG. 5, the process 600 of FIG. 6, and/or the process 700 of FIG. 7.

The system 100 includes a vehicle 110. For example, the vehicle 110 may be an electric automobile, a truck, a boat, or an aircraft. The vehicle 110 includes a battery 112, which may be used to power one or more motors of the vehicle 110. For example, the battery 112 may be a lithium-ion battery, a nickel-metal hydride battery, or a lead-acid battery. The vehicle 110 includes an on-board alternating current to direct current converter 114, which may be used to charge the battery 112. The on-board alternating current to direct current converter 114 may have direct current terminals connected to terminals of the battery 112. The on-board alternating current to direct current converter 114 may be part of a versatile on-board charger that draws low power levels (e.g., 7 kW or 10 kW) from commonly available alternating current power outlets. For example, the on-board alternating current to direct current converter 114 may be configured to convert single phase (e.g., at 50 Hz or 60 Hz) alternating current at 120 Volts or 240 Volts to direct current for charging the battery 112. For example, the vehicle 110 may be the vehicle 310 of FIG. 3.

The vehicle 110 also includes a processing apparatus 116 that controls the components of the vehicle 110 associated with the battery 112, including the on-board alternating current to direct current converter 114. For example, the processing apparatus 116 may implement a battery management system for the vehicle 110. The processing apparatus 116 is operable to execute instructions that have been stored in a data storage device. In some implementations, the processing apparatus 116 is a processor with random access memory for temporarily storing instructions read from a data storage device while the instructions are being executed. The processing apparatus 116 may include single or multiple processors each having single or multiple processing cores. For example, the processing apparatus 116 may include a microprocessor or a microcontroller. Alternatively, the processing apparatus 116 may include another type of device, or multiple devices, capable of manipulating or processing data. For example, the data storage device may be a non-volatile information storage device such as a hard drive, a solid-state drive, a read-only memory device (ROM), or any other suitable type of storage device such as a non-transitory computer readable memory. The data storage device may include another type of device, or multiple devices, capable of storing data for retrieval or processing by the processing apparatus 116. For example, a data storage device of the processing apparatus 116 may store instructions executable by the processing apparatus 116 that upon execution by the processing apparatus 116 cause the processing apparatus 116 to perform operations to implement one or more processes described herein. The processing apparatus 116 may include one or more input/output interfaces (e.g., serial ports) for controlling other components of the vehicle 110, including the on-board alternating current to direct current converter 114, and/or external devices. For example, the processing apparatus 116 may be configured to select modulation waveforms for gate terminals of switches of a rectifier of the on-board alternating current to direct current converter 114 to enable and control the flow of electric power through the on-board alternating current to direct current converter 114.

The system 100 includes an alternating current circuit breaker panel 140 that connects to a power grid. For example, the alternating current circuit breaker panel 140 may be located in a home or other residential structure.

The system 100 includes a charger 120 that can be, and in FIG. 1 is, connected to the vehicle 110. The charger 120 is configured to transfer power between a power grid, via the alternating current circuit breaker panel 140, and the battery 112 of the vehicle 110. For example, the charger 120 may be an electric vehicle service equipment (EVSE). For example, the charger 120 may be the charger 210 of FIG. 2A or the charger 252 of FIG. 2B.

The system 100 includes a first alternating current to direct current converter 122. The first alternating current to direct current converter 122 may be integrated in the charger 120 and configured to convert alternating current from the power grid to direct current that may be used to charge the battery 112 of the vehicle 110. For example, the first alternating current to direct current converter 122 may be larger than the on-board alternating current to direct current converter 114, since it will not add weight to the vehicle 110. For example, the first alternating current to direct current converter 122 may be used to supply additional power (e.g., 20 kW to 50 kW of additional power) in parallel with power delivered via the on-board alternating current to direct current converter 114 to charge the battery 112 of the vehicle 110. For example, the first alternating current to direct current converter 122 may include a transformer and a rectifier (e.g., a full-wave rectifier). For example, the first alternating current to direct current converter 122 may include a switched-mode power supply.

The charger 120 is connected to the vehicle 110 via mated charging plug interfaces 130 of the charger 120 (e.g., the charging plug interface 220 of FIGS. 2A-C) and the vehicle 110 (e.g., the charging plug interface 330 of FIG. 3). The charging plug interfaces 130 include a first pair of conductors 132 connected to alternating current input terminals of the first alternating current to direct current converter 122 and a second pair of conductors 134 connected to direct current terminals of the first alternating current to direct current converter 122. In the vehicle 110, the first pair of conductors 132 may be connected to alternating current terminals of the on-board alternating current to direct current converter 114 and the second pair of conductors 134 may be connected to terminals of the battery 112. For example, the charging plug interfaces 130 may conform to a standard, such as the J1772 standard for electric vehicle connectors.

The system 100 includes a processing apparatus 126, which may be integrated in the charger 120. The processing apparatus 126 is operable to execute instructions that have been stored in a data storage device. In some implementations, the processing apparatus 126 is a processor with random access memory for temporarily storing instructions read from a data storage device while the instructions are being executed. The processing apparatus 126 may include single or multiple processors each having single or multiple processing cores. For example, the processing apparatus 126 may include a microprocessor or a microcontroller. Alternatively, the processing apparatus 126 may include another type of device, or multiple devices, capable of manipulating or processing data. For example, the data storage device may be a non-volatile information storage device such as a hard drive, a solid-state drive, a read-only memory device (ROM), or any other suitable type of storage device such as a non-transitory computer readable memory. The data storage device may include another type of device, or multiple devices, capable of storing data for retrieval or processing by the processing apparatus 126. For example, a data storage device of the processing apparatus 126 may store instructions executable by the processing apparatus 126 that upon execution by the processing apparatus 126 cause the processing apparatus 126 to perform operations to implement one or more processes described herein. The processing apparatus 126 may include one or more input/output interfaces (e.g., serial ports) for controlling other components of the charger 120, including the first alternating current to direct current converter 122, and/or external devices. For example, the processing apparatus 126 may be configured to select modulation waveforms for gate terminals of switches of a rectifier of the first alternating current to direct current converter 122 to enable and control the flow of electric power through the first alternating current to direct current converter 122.

The processing apparatus 126 may be configured to communicate with the processing apparatus 116 of the vehicle 110 when the vehicle 110 is connected to the charger 120 and facilitate charging of the battery 112. For example, the processing apparatus 126 may communicate with the processing apparatus 116 via wired communications over conductors of the mated charging plug interfaces 130 or via wireless communications (e.g., using a WiFi network or a Bluetooth link). The processing apparatus 126 may be configured to receive one or more control signals while the vehicle 110 is connected via a charging plug interface of the charger 120; and, responsive to the one or more control signals, charge the battery 112 of the vehicle 110 via direct current flowing through the second pair of conductors 134 concurrent with charging of the battery 112 via alternating current flowing through the first pair of conductors 132 to power the on-board alternating current to direct current converter 114 of the vehicle 110. In some implementations, charging of the battery 112 via the first pair of conductors 132 is performed using a current control mode and charging of the battery 112 via the second pair of conductors 134 is performed using a current control mode. In some implementations, charging of the battery 112 via the first pair of conductors 132 is performed using a voltage control mode and charging of the battery 112 via the second pair of conductors 134 is performed using a current control mode. In some implementations, charging of the battery 112 via the first pair of conductors 132 is performed using a current control mode and charging of the battery 112 via the second pair of conductors 134 is performed using a voltage control mode.

In some implementations, the first alternating current to direct current converter 122 is bidirectional and the processing apparatus 126 is configured to enable the draw of power from the battery 112 of the vehicle 110 to power an external system (e.g., to power a home during a power outage). For example, the processing apparatus 126 may be configured to receive a command (e.g., a special command to invoke use of the battery 112 of the vehicle 110 as a back-up power source); and, responsive to the command, draw power from the battery 112 of the vehicle 110 via the second pair of conductors 134 and the first alternating current to direct current converter 122.

For example, the processing apparatus 126 may be configured to provide a user interface of the charger 120 that enables user control or configuration of a charging process for the battery 112 of the vehicle 110. In some implementations, the processing apparatus 126 is configured to present a user interface (e.g., by transmitting a webpage viewable with user device such as smartphone or tablet); receive one or more charge parameters (e.g., a time-till departure or other time limits for a charging process) via the user interface; and adjust current flow on the second pair of conductors 134 during charging based on the one or more charge parameters.

FIG. 2A is a block diagram of an example of a system 200 including charger 210 with a charging plug interface 220 for connecting to a vehicle and charging a vehicle battery. The system 200 includes a charger 210 that can be connected to a vehicle (e.g., the vehicle 310) to charge a battery of the vehicle. The charger 210 includes a first alternating current to direct current converter 212, a processing apparatus 216, and a charging plug interface 220 configured to connect to a mated charging plug interface (e.g., the charging plug interface 330 of FIG. 3) of a compatible vehicle. The charging plug interface 220 includes a first pair of conductors 222 (e.g., AC conductors) connected to alternating current input terminals of the first alternating current to direct current converter 212 and a second pair of conductors 224 (e.g., DC conductors) connected to direct current terminals of the first alternating current to direct current converter 212. The charger 210 includes a transceiver 214 connected to one or more conductors 226 (e.g., communications conductors) of the charging plug interface 220. The charger 210 includes a charger battery 230 and a direct current to direct current converter 232 coupling the charger battery 230 to the second pair of conductors 224. The charger 210 is connected to an alternating current circuit breaker panel 240 that connects to a power grid. The charger battery 230 may be configured to store energy drawn from the power grid or elsewhere over a relatively long period of time (e.g., approximately 24 hours) and rapidly transfer this stored energy to a battery of a vehicle via the direct current to direct current converter 232 and the second pair of conductors 224, which may enable significantly faster charge times. For example, the system 200 may be used to implement the process 400 of FIG. 4, the process 500 of FIG. 5, the process 600 of FIG. 6, and/or the process 700 of FIG. 7.

The system 200 includes an alternating current circuit breaker panel 240 that connects to a power grid. For example, the alternating current circuit breaker panel 240 may be located in a home or other residential structure.

The system 200 includes a charger 210 that can be connected to a vehicle (e.g., the vehicle 310). The charger 210 is configured to transfer power between a power grid, via the alternating current circuit breaker panel 240, and a battery of the vehicle. For example, the charger 210 may be an electric vehicle service equipment (EVSE).

The system 200 includes a first alternating current to direct current converter 212. The first alternating current to direct current converter 212 may be integrated in the charger 210 and configured to convert alternating current from the power grid to direct current that may be used to charge a battery of the vehicle (e.g., the battery 312). For example, the first alternating current to direct current converter 212 may be larger than an on-board alternating current to direct current converter of the vehicle, since it will not add weight to the vehicle. For example, the first alternating current to direct current converter 212 may be used to supply additional power (e.g., 20 kW to 50 kW of additional power) in parallel with power delivered via the on-board alternating current to direct current converter to charge the battery of the vehicle. For example, the first alternating current to direct current converter 212 may include a transformer and a rectifier (e.g., a full-wave rectifier). For example, the first alternating current to direct current converter 212 may include a switched-mode power supply.

The charger 210 includes a charging plug interface 220 that may be used to connect to a vehicle at a corresponding charging plug interface of the vehicle (e.g., the charging plug interface 330 of FIG. 3). The charging plug interface 220 includes a first pair of conductors 222 connected to alternating current input terminals of the first alternating current to direct current converter 212 and a second pair of conductors 224 connected to direct current terminals of the first alternating current to direct current converter 212. For example, the charging plug interface 220 may conform to a standard, such as the J1772 standard for electric vehicle connectors.

The system 200 includes a charger battery 230. For example, the charger battery 230 may have a capacity of 10 kWh, 30 kWh, 60 kWh, or 100 kWh. In some implementations, the charger battery 230 may have a capacity comparable to a capacity of a vehicle battery to be charged. The charger battery 230 may use a variety of chemistries. For example, the charger battery 230 may be a lithium-ion battery, a nickel-metal hydride battery, or a lead-acid battery. The charger battery 230 may be configured to be charged efficiently over an extended period of time (e.g., 5 to 20 hours) from a power grid or other electrical power source. For example, the charger battery 230 may be configured to be charged from an alternating current power grid using a time-of-use management protocol or a demand response protocol.

The system 200 includes a direct current to direct current converter 232 coupling the charger battery 230 to the second pair of conductors 224. For example, the direct current to direct current converter 232 may be a switched-mode power supply. The direct current to direct current converter 232 and the charger battery 230 may support high discharge rates for rapid transfer of energy from the charger battery 230 to a battery of a vehicle (e.g., the battery 312). For example, the direct current to direct current converter 232 and the charger battery 230 may transfer energy to the battery of a vehicle at 20 kW, 50 kW, 100 kW, or 150 kW. For example, the direct current to direct current converter 232 may be configured to charge the battery of a vehicle using a current control mode. Charging of the battery of a vehicle from the charger battery 230 may proceed concurrently with charging using the first alternating current to direct current converter 212 and/or using an on-board alternating current to direct current converter of the vehicle. In some implementations, the direct current to direct current converter 232 is bidirectional and may be used in controlled in coordination with the first alternating current to direct current converter 212 to charge the charger battery 230 from the grid while the no vehicle is connected to the charging plug interface 220. In some implementations, the system 200 includes a separate alternating current to direct current converter (not shown in FIG. 2A) coupling the charger battery 230 to the circuit breaker panel 240 connected to the power grid for charging the charger battery 230.

The system 200 includes a transceiver 214 connected to one or more conductors 226 of the charging plug interface 220. For example, the transceiver 214 may enable communications over the one or more conductors 226 using a standard compliant signaling protocol (e.g., a vehicle to grid protocol, such as ISO/IEC 15118-series). In some implementations, the one or more conductors 226 are separate conductors, distinct from the first pair of conductors 222 and the second pair of conductors 224. In some implementations, the transceiver 214 implements a broadband over power line communication protocol (e.g., compliant with the IEEE 1901 standard) and the one or more conductors 226 are one or more of the second pair of conductors 224, i.e., conductors are reused for both power transfer and communications between the charger 210 and a vehicle.

The system 200 includes a processing apparatus 216, which may be integrated in the charger 210. In some implementations, the processing apparatus 216 is located partially or entirely outside of the charger 210 and be in communication with the charger 210. The processing apparatus 216 is operable to execute instructions that have been stored in a data storage device. In some implementations, the processing apparatus 216 is a processor with random access memory for temporarily storing instructions read from a data storage device while the instructions are being executed. The processing apparatus 216 may include single or multiple processors each having single or multiple processing cores. For example, the processing apparatus 216 may include a microprocessor or a microcontroller. Alternatively, the processing apparatus 216 may include another type of device, or multiple devices, capable of manipulating or processing data. For example, the data storage device may be a non-volatile information storage device such as a hard drive, a solid-state drive, a read-only memory device (ROM), or any other suitable type of storage device such as a non-transitory computer readable memory. The data storage device may include another type of device, or multiple devices, capable of storing data for retrieval or processing by the processing apparatus 216. For example, a data storage device of the processing apparatus 216 may store instructions executable by the processing apparatus 216 that upon execution by the processing apparatus 216 cause the processing apparatus 216 to perform operations to implement one or more processes described herein. The processing apparatus 216 may include one or more input/output interfaces (e.g., serial ports) for controlling other components of the charger 210, including the first alternating current to direct current converter 212, the transceiver 214, the direct current to direct current converter 232, and/or external devices. For example, the processing apparatus 216 may be configured to select modulation waveforms for gate terminals of switches of a rectifier of the first alternating current to direct current converter 212 to enable and control the flow of electric power through the first alternating current to direct current converter 212. For example, the processing apparatus 216 may be configured to control the transceiver 214 to send/receive data to/from a processing apparatus (e.g., a battery management system) of a vehicle connected to charging plug interface 220. For example, the processing apparatus 216 may be configured to select modulation waveforms for gate terminals of switches of the direct current to direct current converter 232 to enable and control the flow of electric power through the direct current to direct current converter 232.

The processing apparatus 216 may be configured to communicate with a processing apparatus (e.g., the processing apparatus 316) of a vehicle when the vehicle is connected to the charger 210 and facilitate charging of a battery (e.g., the battery 312) of the vehicle. In this example, the processing apparatus 216 communicates with the processing apparatus of a vehicle via wired communications over the one or more conductors 226 of the charging plug interface 220. The processing apparatus 216 may be configured to receive one or more control signals while the vehicle is connected via the charging plug interface 220; and, responsive to the one or more control signals, charge the battery of the vehicle via direct current flowing through the second pair of conductors 224 concurrent with charging of the battery via alternating current flowing through the first pair of conductors 222 to power an on-board alternating current to direct current converter of the vehicle. In some implementations, charging of the battery via the first pair of conductors 222 is performed using a current control mode and charging of the battery via the second pair of conductors 224 is performed using a current control mode. In some implementations, charging of the battery via the first pair of conductors 222 is performed using a voltage control mode and charging of the battery via the second pair of conductors 224 is performed using a current control mode. In some implementations, charging of the battery via the first pair of conductors 222 is performed using a current control mode and charging of the battery via the second pair of conductors 224 is performed using a voltage control mode. For example, the processing apparatus 216 may be configured to receive the one or more control signals using the transceiver 214. The processing apparatus 216 may be configured to, responsive to the one or more control signals, charge the battery of the vehicle from the charger battery 230 via direct current flowing from the direct current to direct current converter 232 through the second pair of conductors 224. In some implementations, the rate at which energy is transferred from the charger battery 230 to the battery of the vehicle may be dynamically adjusted based on charging parameters (e.g. a time limit) received through a user interface, as described in relation to the process 700 of FIG. 7. The charger battery 230 may be used to achieve significantly faster charging times that can be achieved with the on-board alternating current to direct current converter and the first on-board alternating current to direct current converter 212, which may have its power limited by the circuit breaker panel 240.

FIG. 2B is a block diagram of an example of a system 250 including a solar cell 260 and a charger 252 with a charging plug interface 220 for connecting to a vehicle and charging a vehicle battery. The system 250 is similar to the system 200 of FIG. 2A with a few differences. First, in the system 250, the charger battery 230 and the direct current to direct current converter 232 are located outside the charger 252. For example, the charger battery 230 and the direct current to direct current converter 232 may be in a separate battery module that is connected to the charger 252 and configured to be controlled by the processing apparatus 216. Second, the system 250 includes a solar cell 260; and a direct current to direct current converter 262 coupling the solar cell 260 to the second pair of conductors 224. Third, the system 250 includes one or more additional alternating current to direct current converters 270 connected in parallel with first alternating current to direct current converter 212, which may be selectively activated to adapt the charging of a vehicle battery to different charging scenarios. For example, the system 250 may be used to implement the process 400 of FIG. 4, the process 500 of FIG. 5, the process 600 of FIG. 6, and/or the process 700 of FIG. 7.

The system 250 includes a solar cell 260. The solar cell 260 is configured to convert light to electricity by the photovoltaic effect. The solar cell 260 may be coupled to the first alternating current to direct current converter via a direct current bus. The system 250 includes a direct current to direct current converter 262 coupling the solar cell 260 to the second pair of conductors 224, which may enable the transfer of electrical energy generated by the solar cell 260 to a battery of a vehicle via the second pair of conductors 224. The processing apparatus 216 of the charger 252 may be configured to control the direct current to direct current converter 262. The processing apparatus 216 may be configured to, responsive to the one or more control signals, charge the battery of the vehicle from the solar cell 260 via direct current flowing from the direct current to direct current converter 262 through the second pair of conductors 224. For example, charging directly from the solar panel may be unavailable at night and under certain weather conditions, in which case the direct current to direct current converter 262 may be disabled by the processing apparatus 216 and the charging capabilities advertised by the processing apparatus in communications with a vehicle may be updated accordingly. The charger battery 230 may be configured to be charged from the solar cell 260. In some implementations, the direct current to direct current converter 232 may be bidirectional and may be controlled along with the direct current to direct current converter 262 to charge the charger battery 230 with energy from the solar cell 260 while no vehicle is connected to the charging plug interface 220.

The system 250 includes one or more additional alternating current to direct current converters 270 connected in parallel with first alternating current to direct current converter 212. The processing apparatus 216 may be configured to, responsive to the one or more control signals from a vehicle, select one or more alternating current to direct current converters from among the first alternating current to direct current converter 212 and the one or more additional alternating current to direct current converters 270. The selected one or more alternating current to direct current converters may be activated to charge a battery (e.g., the battery 312) of the vehicle via direct current flowing through the second pair of conductors 224. By selectively activating alternating current to direct current converters, the processing apparatus 216 may adapt the power level output by the charger 252 to charge the battery of the vehicle to suit different charging scenarios.

FIG. 2C is a block diagram of an example of a system 280 including a solar cell 260 connected via an alternating current bus to a charger 252 with a charging plug interface 220 for connecting to a vehicle and charging a vehicle battery. The system 250 is similar to the system 250 of FIG. 2B with a one main difference. The solar cell 260 is coupled to the first alternating current to direct current converter 212 via an alternating current bus. The system 280 includes a direct current to alternating current converter 290, instead of the direct current to direct current converter 262. For example, the direct current to alternating current converter 290 may include a switching inverter. Energy from the solar cell 260 may flow through the direct current to alternating current converter 290, through the alternating current bus, and through the first pair of conductors 222 to an on-board alternating current to direct current converter (e.g., the on-board alternating current to direct current converter 314) of a vehicle connected to the charging plug interface 220. Energy from the solar cell 260 may also flow through the direct current to alternating current converter 290, through the alternating current bus, through the first alternating current to direct current converter 212, and through the second pair of conductors 224 to charge a battery (e.g., the battery 312) of a vehicle connected to the charging plug interface 220. In some implementations, when no vehicle is connected to the charging plug interface 220, energy from the solar cell 260 may flow through the direct current to alternating current converter 290, through the alternating current bus, through the first alternating current to direct current converter 212, and through the direct current to direct current converter 232 to charge the charger battery 230. In some implementations, when no vehicle is connected to the charging plug interface 220, energy from the solar cell 260 may flow through the direct current to alternating current converter 290, through the alternating current bus, and through a separate alternating current to direct current converter (not shown in FIG. 2C) coupling the charger battery 230 to the circuit breaker panel 240 connected to the power grid for charging the charger battery 230. For example, the system 280 may be used to implement the process 400 of FIG. 4, the process 500 of FIG. 5, the process 600 of FIG. 6, and/or the process 700 of FIG. 7.

FIG. 3 is a block diagram of an example of a system 300 including a vehicle 310 with a charging plug interface 330 configured to facilitate charging of a vehicle battery 312. The vehicle 310 includes a battery 312, an on-board alternating current to direct current converter 314, a processing apparatus 316, a transceiver 318, one or more motors 320, and a charging plug interface 330. The charging plug interface 330 includes a first pair of conductors 332 (e.g., AC conductors) connected to alternating current terminals of the on-board alternating current to direct current converter 314 and a second pair of conductors 334 (e.g., DC conductors) connected to terminals of the battery 312. The transceiver 318 is connected to one or more conductors 336 (e.g., communications conductors) of the charging plug interface 330. The processing apparatus 316 is configured to transmit one or more control signals to invoke charging of the battery 312 via direct current flowing through the second pair of conductors 334 concurrent with charging of the battery 312 via alternating current flowing through the first pair of conductors 332 to power the on-board alternating current to direct current converter 314. For example, the system 300 may be used to implement the process 400 of FIG. 4, the process 500 of FIG. 5, the process 600 of FIG. 6, and/or the process 700 of FIG. 7.

The system 300 includes a vehicle 310. For example, the vehicle 310 may be an electric automobile, a truck, a boat, or an aircraft. The vehicle includes one or more motors 320. For example, the one or more motors 320 may be used move the vehicle 310 by turning wheels or propellers. For example, the one or more motors 320 may include a direct current brushless motor.

The vehicle 310 includes a battery 312 configured to deliver power to the one or more motors 320 to move the vehicle. For example, the battery 312 may be a lithium-ion battery, a nickel-metal hydride battery, or a lead-acid battery.

The vehicle 310 includes an on-board alternating current to direct current converter 314 with direct current terminals connected to terminals of the battery 312. The on-board alternating current to direct current converter 314 may be used to charge the battery 312. The on-board alternating current to direct current converter 314 may be part of a versatile on-board charger that draws low power levels (e.g., 7 kW or 10 kW) from commonly available alternating current power outlets. For example, the on-board alternating current to direct current converter 314 may be configured to convert single phase (e.g., at 50 Hz or 60 Hz) alternating current at 120 Volts or 240 Volts to direct current for charging the battery 312.

The vehicle 310 includes a processing apparatus 316 that controls the components of the vehicle 310 associated with the battery 312, including the on-board alternating current to direct current converter 314. For example, the processing apparatus 316 may implement a battery management system for the vehicle 310. The processing apparatus 316 is operable to execute instructions that have been stored in a data storage device. In some implementations, the processing apparatus 316 is a processor with random access memory for temporarily storing instructions read from a data storage device while the instructions are being executed. The processing apparatus 316 may include single or multiple processors each having single or multiple processing cores. For example, the processing apparatus 316 may include a microprocessor or a microcontroller. Alternatively, the processing apparatus 316 may include another type of device, or multiple devices, capable of manipulating or processing data. For example, the data storage device may be a non-volatile information storage device such as a hard drive, a solid-state drive, a read-only memory device (ROM), or any other suitable type of storage device such as a non-transitory computer readable memory. The data storage device may include another type of device, or multiple devices, capable of storing data for retrieval or processing by the processing apparatus 316. For example, a data storage device of the processing apparatus 316 may store instructions executable by the processing apparatus 316 that upon execution by the processing apparatus 316 cause the processing apparatus 316 to perform operations to implement one or more processes described herein. The processing apparatus 316 may include one or more input/output interfaces (e.g., serial ports) for controlling other components of the vehicle 310, including the on-board alternating current to direct current converter 314 and the transceiver 318. For example, the processing apparatus 316 may be configured to select modulation waveforms for gate terminals of switches of a rectifier of the on-board alternating current to direct current converter 314 to enable and control the flow of electric power through the on-board alternating current to direct current converter 314. For example, the processing apparatus 316 may be configured to control the transceiver 318 to send/receive data to/from a processing apparatus (e.g., an electrical vehicle service equipment (EVSE)) of a charger (e.g., the charger 210 or the charger 252) connected to the charging plug interface 330.

The vehicle 310 includes a transceiver 318 connected to one or more conductors 336 of the charging plug interface 330. For example, the transceiver 318 may enable communications over the one or more conductors 336 using a standard compliant signaling protocol (e.g., a vehicle to grid protocol, such as ISO/IEC 15118-series). In some implementations, the one or more conductors 336 are separate conductors, distinct from the first pair of conductors 332 and the second pair of conductors 334. In some implementations, the transceiver 318 implements a broadband over power line communication protocol (e.g., compliant with the IEEE 1901 standard) and the one or more conductors 336 are one or more of the second pair of conductors 334, i.e., conductors are reused for both power transfer and communications between a charger and the vehicle 310.

The vehicle 310 includes a charging plug interface 330 including a first pair of conductors 332 connected to alternating current terminals of the on-board alternating current to direct current converter 314 and a second pair of conductors 334 connected to terminals of the battery 312. The charging plug interface 330 may be used to connect to a charger at a corresponding charging plug interface of the charger (e.g., the charging plug interface 220 of FIGS. 2A-C). For example, the charging plug interface 330 may conform to a standard, such as the J1772 standard for electric vehicle connectors.

The processing apparatus 316 may be configured to communicate with a processing apparatus (e.g., the processing apparatus 216) of an external/off-board charger (e.g., the charger 210) when the vehicle 310 is connected to the charger and facilitate charging of the battery 312. In this example, the processing apparatus 316 communicates with the processing apparatus of a charger via wired communications over the one or more conductors 336 of the charging plug interface 330. The processing apparatus 316 may be configured to transmit one or more control signals to invoke charging of the battery 312 via direct current flowing through the second pair of conductors 334 concurrent with charging of the battery 312 via alternating current flowing through the first pair of conductors 332 to power the on-board alternating current to direct current converter 314. In some implementations, charging of the battery 312 via the first pair of conductors 332 is performed using a current control mode and charging of the battery 312 via the second pair of conductors 334 is performed using a current control mode. In some implementations, charging of the battery 312 via the first pair of conductors 332 is performed using a voltage control mode and charging of the battery 312 via the second pair of conductors 334 is performed using a current control mode. In some implementations, charging of the battery 312 via the first pair of conductors 332 is performed using a current control mode and charging of the battery 312 via the second pair of conductors 334 is performed using a voltage control mode. For example, the processing apparatus 316 may be configured to transmit the one or more control signals using the transceiver 318. In some implementations, the rate at which energy is transferred from a charger the vehicle 310 may be dynamically adjusted based on charging parameters (e.g. a time limit) received through a user interface, as described in relation to the process 700 of FIG. 7.

FIG. 4 is a flow chart of an example of a process 400 for charging a vehicle battery using an external charger. The process 400 includes connecting 410 a vehicle to a charger using a charging plug interface that includes a first pair of conductors connected to alternating current terminals of an on-board alternating current-to-direct current converter of the vehicle and a second pair of conductors connected to terminals of a battery of the vehicle; and charging 420 the battery of the vehicle via direct current flowing through the second pair of conductors concurrent with charging of the battery via alternating current flowing through the first pair of conductors to power the on-board alternating current to direct current converter. For example, the process 400 may be implemented using the system 100 of FIG. 1. For example, the process 400 may be implemented using the system 200 of FIG. 2A with the vehicle 310 of FIG. 3. For example, the process 400 may be implemented using the system 250 of FIG. 2B with the vehicle 310 of FIG. 3. For example, the process 400 may be implemented using the system 280 of FIG. 2C with the vehicle 310 of FIG. 3.

The process 400 includes connecting 410 a vehicle (e.g., the vehicle 110 or the vehicle 310) to a charger (e.g., the charger 120, the charger 210, or the charger 252) using a charging plug interface (e.g., the charging plug interface 220) that includes a first pair of conductors connected to alternating current terminals of an on-board alternating current-to-direct current converter (e.g., the on-board alternating current-to-direct current converter 314) of the vehicle and a second pair of conductors connected to terminals of a battery (e.g., the battery 312) of the vehicle. For example, the vehicle may be positioned (e.g., parked) near the charger, and then a charging plug interface of the charger may be connected 410 to a charging plug interface of the vehicle. A mechanical connection between the two charging plug interfaces may form electrical connections between corresponding conductors of the two charging plug interfaces, including the first pair of conductors and the second pair of conductors. Connecting 410 the vehicle to the charger may cause communications between processing apparatus of the vehicle (e.g., a battery management system) and a processing apparatus of the charger (e.g., an EVSE) to be initiated.

The process 400 includes charging 420 the battery of the vehicle via direct current flowing through the second pair of conductors concurrent with charging 420 of the battery via alternating current flowing through the first pair of conductors to power the on-board alternating current to direct current converter. In some implementations, charging 420 of the battery via the first pair of conductors is performed using a current control mode and charging 420 of the battery via the second pair of conductors is performed using a current control mode. In some implementations, charging 420 of the battery via the first pair of conductors is performed using a voltage control mode and charging 420 of the battery via the second pair of conductors is performed using a current control mode. In some implementations, charging 420 of the battery via the first pair of conductors is performed using a current control mode and charging 420 of the battery via the second pair of conductors is performed using a voltage control mode. The charger may provide power from a variety of sources through the conductors of the charging plug interfaces to charge the battery of the vehicle. For example, the process 500 of FIG. 5 may be implemented to charge 420 the battery.

In some circumstances, such as a power outage, it may be desirable to reverse the flow of power through the charger to draw power from the battery of the vehicle for other uses (e.g., to power appliances in a home). For this purpose, the charger may include one or more power converters that are bidirectional. For example, the process 600 of FIG. 6 may be implemented to reverse the flow of power through the charger and draw power from the battery of the vehicle.

FIG. 5 is a flow chart of an example of a process 500 for charging a vehicle battery using a variety of power sources coordinated by an external charger. Various sources of electrical power may be converted to direct current and supplied to the vehicle via a pair of conductors of a charging plug interface that are used carry direct current (e.g., the second pair of conductors 224 and the second pair of conductors 334). The process 500 includes selecting 510 one or more alternating current to direct current converters from among multiple alternating current to direct current converters of the charger; charging 520 the battery of the vehicle using the selected one or more alternating current to direct current converters; charging 530 the battery of the vehicle from a charger battery; and charging 540 the battery of the vehicle from a solar cell. The charging steps (520, 530, and 540) of the process 500 may be performed concurrently or in a variety of serialized orders. For example, the vehicle battery may be charged (530, 540) from the charger battery and the solar cell concurrently to start, and, after the charging battery becomes depleted, the vehicle battery may be charged (520, 540) using the selected one or more alternating current to direct current converters battery and the solar cell concurrently. In some implementations, steps of the process 500 may be omitted where corresponding components of the charger are not available. For example, the process 400 may be implemented using the system 200 of FIG. 2A with the vehicle 310 of FIG. 3. For example, the process 400 may be implemented using the system 250 of FIG. 2B with the vehicle 310 of FIG. 3. For example, the process 400 may be implemented using the system 280 of FIG. 2C with the vehicle 310 of FIG. 3.

The process 500 includes selecting 510 one or more alternating current to direct current converters from among multiple alternating current to direct current converters of the charger (e.g., the first alternating current to direct current converter 212 and the additional alternating current to direct current converters 270). For example, the alternating current to direct current converters may be selected 510 based on one or more control signals received from a vehicle, which may specify current level for charging or other charging parameters. In some implementations, charging parameters may be entered through a user interface of the charger or the vehicle, and the one or more alternating current to direct current converters may be selected 510 based on the charging parameters (e.g., a time limit for charging or a maximum current level). For example, the process 700 of FIG. 7 may be implemented to determine the charging parameters.

The selected 510 one or more alternating current to direct current converters are activated to charge 520 the battery of the vehicle via direct current flowing through the second pair of conductors. By selectively activating alternating current to direct current converters, the power level output by the charger may be adapted to charge the battery of the vehicle in modes suited to different charging scenarios.

The process 500 includes charging 530 the battery (e.g., the battery 312) of the vehicle from a charger battery (e.g., the charger battery 230) via direct current flowing from a direct current to direct current converter (e.g., the direct current to direct current converter 232) through the second pair of conductors (e.g., DC conductors). High power levels may be drawn from the charger battery to charge the battery of the vehicle significantly faster than it could be charged using power drawn from a power grid through a circuit breaker panel (e.g., the circuit breaker panel 240), which may limit current draw from the power grid. In some cases, the charger battery can be charged efficiently at opportune times between chargings of the battery of the vehicle to improve the energy efficiency of the overall system.

The process 500 includes charging 540 the battery of the vehicle from a solar cell via direct current flowing from a direct current to direct current converter through the second pair of conductors. The solar cell can provide another source of clean and economic energy for charging the vehicle battery. In some implementations, the solar cell can also be used to charge the charger battery from the solar cell.

FIG. 6 is a flow chart of an example of a process 600 for powering an external system from a vehicle battery via an external charger. The process 600 includes receiving 610 a command; and, responsive to the command, drawing 620 power from a battery (e.g., the battery 312) of a vehicle via the second pair of conductors and a bidirectional alternating current to direct current converter of the charger. For example, the command may be received 610 via a user interface of the vehicle or the external charger. The command may indicate that power should be drawn from the vehicle battery. For example, power may be drawn from the battery of the vehicle to power appliances of a home attached to the external charger during a power outage of a power grid. For example, power may be drawn from the battery of the vehicle to supply power to a power grid at opportune times when it is need elsewhere. For example, the process 600 may be implemented using the system 100 of FIG. 1. For example, the process 600 may be implemented using the system 200 of FIG. 2A with the vehicle 310 of FIG. 3. For example, the process 600 may be implemented using the system 250 of FIG. 2B with the vehicle 310 of FIG. 3. For example, the process 600 may be implemented using the system 280 of FIG. 2C with the vehicle 310 of FIG. 3.

FIG. 7 is a flow chart of an example of a process 700 for providing a user interface to enable user control of a charging process for a vehicle battery. The process 700 includes presenting 710 a user interface; receiving 720 one or more charge parameters via the user interface; and adjusting 730 current flow on conductors of a charging plug interface during charging based on the one or more charge parameters. For example, the process 700 may be implemented using the system 100 of FIG. 1. For example, the process 700 may be implemented using the system 200 of FIG. 2A with the vehicle 310 of FIG. 3. For example, the process 700 may be implemented using the system 250 of FIG. 2B with the vehicle 310 of FIG. 3. For example, the process 700 may be implemented using the system 280 of FIG. 2C with the vehicle 310 of FIG. 3.

The process 700 includes presenting 710 a user interface. For example, the user interface may be a graphical user interface that has fields or icons for entering or selecting charge parameters, such as a time limit for a charge operation, a charging mode, a current limit, and/or a power source type (e.g., grid and/or solar cell). For example, the user interface may be presented 710 by transmitting data encoding the user interface to user computing device (e.g., a smartphone or a tablet) that a user can use to view and interact with the user interface. For example, the user interface may be presented 710 by displaying the user interface in a display of the charger or a display of the vehicle.

The process 700 includes receiving 720 one or more charge parameters via the user interface. For example, a user may input the one or more charging parameters by interacting with (e.g., selecting icons or entering text) the user interface. For example, the one or more charge parameters may be received 720 by receiving data encoding the one or more charge parameters from a user computing device (e.g., a smartphone or a tablet) that a user used to view and interact with the user interface. For example, the one or more charge parameters may be received 720 by receiving data from an input device (e.g., a touchscreen) of the charger or an input device of the vehicle.

The process 700 includes adjusting 730 current flow on the second pair of conductors (e.g., the second pair of conductors 224) during charging based on the one or more charge parameters. For example, adjusting 730 the current flow may include selecting among multiple alternating current to direct current converters. For example, adjusting 730 the current flow may include selecting or modifying modulation waveforms for gate terminal of switches of an alternating current to direct current converter (e.g., the first alternating current to direct current converter 212). For example, adjusting 730 the current flow may include selecting or modifying modulation waveforms for gate terminal of switches of a direct current to direct current converter coupling a charger battery (e.g., the charger battery 230) to the second pair of conductors. For example, adjusting 730 the current flow may include selecting or modifying modulation waveforms for gate terminal of switches of a direct current to direct current converter (e.g., the a direct current to direct current converter 232) coupling a solar cell (e.g., the solar cell 260) to the second pair of conductors.

As described above, one aspect of the present technology is the gathering and use of data available from various sources to improve a user experience and provide convenience. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better time the charging of a charger battery to be ready for the return of a vehicle for charging or automatically select charging parameters based on usage patterns. Thus, the use of some limited personal information may enhance a user experience. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of vehicle charging services, the present technology can be configured to allow users to select to "opt in" or "opt out" of participation in the collection of personal information data during registration for services or anytime thereafter. In another example, users can select not to provide power usage data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, vehicle charging parameters can be determined by inferring preferences based on non-personal information data or a bare minimum amount of personal information, such as averages of past usage data, other non-personal information available to the vehicle charging service, or publicly available information.

What is claimed is:

1. A system comprising:
a first alternating current to direct current converter;
a charging plug interface including a first pair of conductors connected to alternating current input terminals of the first alternating current to direct current converter and a second pair of conductors connected to direct current terminals of the first alternating current to direct current converter; and
a processing apparatus configured to:
receive one or more control signals while a vehicle is connected to the charging plug interface; and
responsive to the one or more control signals, charge a battery of the vehicle via direct current flowing through the second pair of conductors concurrent with charging of the battery via alternating current flowing through the first pair of conductors to power an on-board alternating current to direct current converter of the vehicle.

2. The system of claim 1, comprising:
a charger battery; and
a direct current to direct current converter coupling the charger battery to the second pair of conductors, wherein the processing apparatus is configured to:
responsive to the one or more control signals, charge the battery of the vehicle from the charger battery via direct current flowing from the direct current to direct current converter through the second pair of conductors.

3. The system of claim 2, wherein the charger battery is configured to be charged from an alternating current power grid using a time-of-use management protocol or a demand response protocol.

4. The system of claim 2, comprising:
a solar cell, wherein the charger battery is configured to be charged from the solar cell.

5. The system of claim 4, wherein the solar cell is coupled to the first alternating current to direct current converter via an alternating current bus.

6. The system of claim 4, wherein the solar cell is coupled to the first alternating current to direct current converter via a direct current bus.

7. The system of claim 1, comprising:
a solar cell; and
a direct current to direct current converter coupling the solar cell to the second pair of conductors, wherein the processing apparatus is configured to:
responsive to the one or more control signals, charge the battery of the vehicle from the solar cell via direct current flowing from the direct current to direct current converter through the second pair of conductors.

8. The system of claim 1, comprising:
one or more additional alternating current to direct current converters connected in parallel with first alternating current to direct current converter, wherein the processing apparatus is configured to:
responsive to the one or more control signals, select one or more alternating current to direct current converters from among the first alternating current to direct current converter and the one or more additional alternating current to direct current converters, wherein the selected one or more alternating current to direct current converters are activated to charge the battery of the vehicle via direct current flowing through the second pair of conductors.

9. The system of claim 1, wherein the first alternating current to direct current converter is bidirectional and the processing apparatus is configured to:
receive a command; and responsive to the command, draw power from the battery of the vehicle via the second pair of conductors and first alternating current to direct current converter.

10. The system of claim 1, wherein the processing apparatus is configured to:
present a user interface;
receive one or more charge parameters via the user interface; and
adjust current flow on the second pair of conductors during charging based on the one or more charge parameters.

11. The system of claim 1, comprising:
a transceiver connected to one or more conductors of the charging plug interface, wherein the processing apparatus is configured to receive the one or more control signals using the transceiver.

12. A method comprising:
connecting a vehicle to a charger using a charging plug interface that includes a first pair of conductors connected to alternating current terminals of an on-board alternating current-to-direct current converter of the vehicle and a second pair of conductors connected to terminals of a battery of the vehicle; and
charging the battery of the vehicle via direct current flowing through the second pair of conductors concurrent with charging of the battery via alternating current flowing through the first pair of conductors to power the on-board alternating current to direct current converter.

13. The method of claim 12, wherein charging of the battery via the first pair of conductors is performed using a current control mode and charging of the battery via the second pair of conductors is performed using a current control mode.

14. The method of claim 12, wherein charging of the battery via the first pair of conductors is performed using a voltage control mode and charging of the battery via the second pair of conductors is performed using a current control mode.

15. The method of claim 12, wherein charging of the battery via the first pair of conductors is performed using a current control mode and charging of the battery via the second pair of conductors is performed using a voltage control mode.

16. The method of claim 12, comprising:
charging the battery of the vehicle from a charger battery via direct current flowing from a direct current to direct current converter through the second pair of conductors.

17. The method of claim 16, comprising:
charging the charger battery from a solar cell.

18. The method of claim 12, comprising:
charging the battery of the vehicle from a solar cell via direct current flowing from a direct current to direct current converter through the second pair of conductors.

19. The method of claim 12, comprising:
selecting one or more alternating current to direct current converters from among multiple alternating current to direct current converters of the charger, wherein the selected one or more alternating current to direct current converters are activated to charge the battery of the vehicle via direct current flowing through the second pair of conductors.

20. The method of claim 12, comprising:
drawing power from the battery of the vehicle via the second pair of conductors and a bidirectional alternating current to direct current converter of the charger.

21. A vehicle comprising:
a battery configured to deliver power to one or more motors to move the vehicle;
an on-board alternating current to direct current converter with direct current terminals connected to terminals of the battery;
a charging plug interface including a first pair of conductors connected to alternating current terminals of the on-board alternating current to direct current converter and a second pair of conductors connected to terminals of the battery; and
a processing apparatus configured to:
transmit one or more control signals to invoke charging of the battery via direct current flowing through the second pair of conductors concurrent with charging of the battery via alternating current flowing through the first pair of conductors to power the on-board alternating current to direct current converter.

22. The vehicle of claim 21, wherein charging of the battery via the first pair of conductors is performed using a current control mode and charging of the battery via the second pair of conductors is performed using a current control mode.

23. The vehicle of claim 21, wherein charging of the battery via the first pair of conductors is performed using a voltage control mode and charging of the battery via the second pair of conductors is performed using a current control mode.

24. The vehicle of claim 21, wherein charging of the battery via the first pair of conductors is performed using a current control mode and charging of the battery via the second pair of conductors is performed using a voltage control mode.

* * * * *